United States Patent
Fukuchi

(10) Patent No.: US 12,325,528 B2
(45) Date of Patent: Jun. 10, 2025

(54) AIRCRAFT COOLING SYSTEM INCLUDING PARALLEL COOLING CIRCUITS WITH COMMON PIPE

(71) Applicant: HONDA MOTOR CO., LTD., Tokyo (JP)

(72) Inventor: Yuichi Fukuchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 104 days.

(21) Appl. No.: 17/697,011

(22) Filed: Mar. 17, 2022

(65) Prior Publication Data

US 2022/0315237 A1 Oct. 6, 2022

(30) Foreign Application Priority Data

Mar. 31, 2021 (JP) ................. 2021-061428

(51) Int. Cl.
| | | |
|---|---|---|
| *B64D 33/08* | (2006.01) | |
| *B64C 29/02* | (2006.01) | |
| *B64U 10/20* | (2023.01) | |
| *B64U 20/92* | (2023.01) | |
| *B64U 20/94* | (2023.01) | |
| *B64U 20/98* | (2023.01) | |
| *B64U 30/10* | (2023.01) | |
| *B64U 30/20* | (2023.01) | |

(Continued)

(52) U.S. Cl.
CPC ............ *B64D 33/08* (2013.01); *B64C 29/02* (2013.01); *B64U 10/20* (2023.01); *B64U 20/92* (2023.01); *B64U 20/94* (2023.01); *B64U 20/98* (2023.01); *B64U 50/19* (2023.01); *B64U 30/10* (2023.01); *B64U 30/20* (2023.01); *B64U 50/33* (2023.01)

(58) Field of Classification Search
CPC ........ B64D 27/24; B64D 33/08; B64C 27/08; B64C 29/02; B64U 20/94; B64U 20/98; B64U 50/19
USPC .......................................................... 244/57
See application file for complete search history.

(56) References Cited

U.S. PATENT DOCUMENTS

| | | | |
|---|---|---|---|
| 2014/0158816 A1 | 6/2014 | DeLorean | |
| 2017/0158342 A1 | 6/2017 | Ishii et al. | |
| 2018/0170569 A1* | 6/2018 | Brodeur | F15B 21/04 |

(Continued)

FOREIGN PATENT DOCUMENTS

| | | |
|---|---|---|
| CN | 108327917 | 7/2018 |
| CN | 108674673 | 10/2018 |

(Continued)

OTHER PUBLICATIONS

Chinese Office Action and Search Report for Chinese Patent Application No. 202210345703.2 dated Sep. 4, 2024.

(Continued)

*Primary Examiner* — Brady W Frazier
(74) *Attorney, Agent, or Firm* — Amin, Turocy & Watson, LLP

(57) ABSTRACT

A cooling system includes a rotor (VTOL rotor, cruise rotor) for generating at least one of lift or thrust of an aircraft, a component group formed of a plurality of electrical components for rotating the rotor, and a cooling circuit for cooling the component group, wherein a plurality of the component groups corresponding to a plurality of the rotors are provided, and the plurality of component groups are cooled by the same cooling circuit.

6 Claims, 9 Drawing Sheets

(51) Int. Cl.
*B64U 50/19* (2023.01)
*B64U 50/33* (2023.01)

(56) References Cited

U.S. PATENT DOCUMENTS

| | | | |
|---|---|---|---|
| 2018/0274563 A1* | 9/2018 | Elving | B64C 13/36 |
| 2019/0009889 A1 | 1/2019 | Toyama et al. | |
| 2020/0115045 A1 | 4/2020 | Mermoz et al. | |
| 2020/0239152 A1 | 7/2020 | Rainville | |
| 2020/0398992 A1* | 12/2020 | Morrison | H01M 8/0488 |
| 2021/0370786 A1* | 12/2021 | Vinson | B64D 41/00 |
| 2022/0119121 A1* | 4/2022 | Lacaux | B64C 11/06 |
| 2022/0250756 A1* | 8/2022 | Wagner | B64D 33/08 |
| 2023/0030399 A1* | 2/2023 | Hanamitsu | B64U 20/80 |
| 2023/0036722 A1 | 2/2023 | Hanamitsu | |
| 2023/0155524 A1 | 5/2023 | Kawazu | |

FOREIGN PATENT DOCUMENTS

| | | |
|---|---|---|
| DE | 202020005116 | 2/2021 |
| JP | 62-120283 | 6/1987 |
| JP | 2017-100651 | 6/2017 |
| JP | 2022-056173 | 4/2022 |
| WO | 2017/154520 | 9/2017 |
| WO | 2021/210065 | 10/2021 |

OTHER PUBLICATIONS

Japanese Office Action for Japanese Patent Application No. 2021-061428 dated Jul. 2, 2024.

* cited by examiner

AIRCRAFT COOLING SYSTEM INCLUDING PARALLEL COOLING CIRCUITS WITH COMMON PIPE

CROSS-REFERENCE TO RELATED APPLICATIONS

This application is based upon and claims the benefit of priority from Japanese Patent Application No. 2021-061428 filed on Mar. 31, 2021, the contents of which are incorporated herein by reference.

BACKGROUND OF THE INVENTION

Field of the Invention

The present invention relates to a cooling system for cooling electrical components for rotating rotors of an aircraft.

Description of the Related Art

US 2020/0115045 A1 discloses an aircraft referred to as an electric vertical take-off and landing aircraft (eVTOL aircraft). This aircraft includes a plurality of vertical takeoff and landing rotors (referred to as VTOL rotors) and a plurality of cruise rotors. Each rotor is connected to an electric motor. The electric motor is connected to a power source via a drive circuit (such as an inverter). The electric motor and the drive circuit generate heat as electric power is supplied thereto. US 2020/0115045 A1 discloses that the electric motor is cooled by air cooling. Further, US 2020/0115045 A1 discloses that air cooling is superior to liquid cooling in terms of simplification and weight reduction of the system.

SUMMARY OF THE INVENTION

US 2020/0115045 A1 does not disclose a configuration for cooling the drive circuit of the electric motor. Further, a liquid-cooled electric motor has a higher output density than an air-cooled electric motor. Therefore, when a high output is required, a liquid-cooled electric motor is desirable. Further, since air cooling is inferior to liquid cooling in cooling capacity, there is a possibility that electrical components such as an electric motor and a drive circuit cannot be sufficiently cooled. Therefore, liquid cooling is desirable in order to sufficiently cool the electrical components.

However, as disclosed in US 2020/0115045 A1, a liquid cooling system has the problem of being complicated and heavy. For example, one set of electric motor and drive circuit is provided for one rotor. If one cooling circuit is provided for one set of the electric motor and the drive circuit, pipes and components (a radiator, a pump, and the like) corresponding to the number of rotors are required, and the entire cooling system becomes complicated and heavy.

An object of the present invention is to solve the aforementioned problem.

According to an aspect of the present invention, provided is a cooling system comprising: a rotor configured to generate at least one of lift or thrust of an aircraft; a component group formed of a plurality of electrical components each configured to rotate the rotor; and a cooling circuit configured to cool the plurality of electrical components, wherein the rotor is provided in plurality, and the component group is provided in plurality, the plurality of component groups corresponding to the plurality of rotors, and each of the plurality of component groups is cooled by the cooling circuit, the cooling circuit being shared by the plurality of component groups.

According to the present invention, the cooling system provided in an aircraft is simplified and lightened.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

1. Configuration of Aircraft 10

Figure 2:
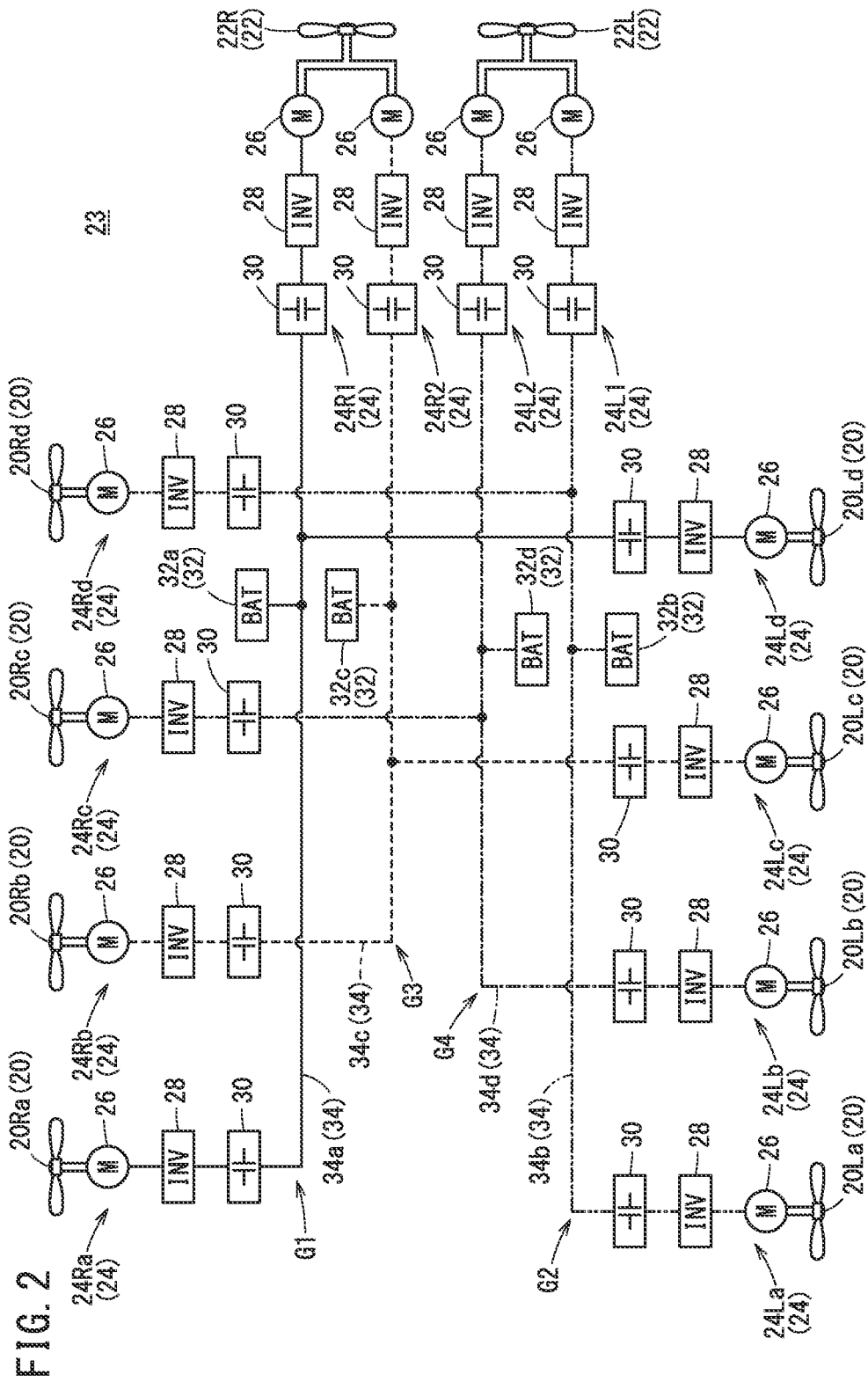
FIG. 2 is a diagram showing an arrangement of each rotor and each component group in a power supply system.
Figure 3:
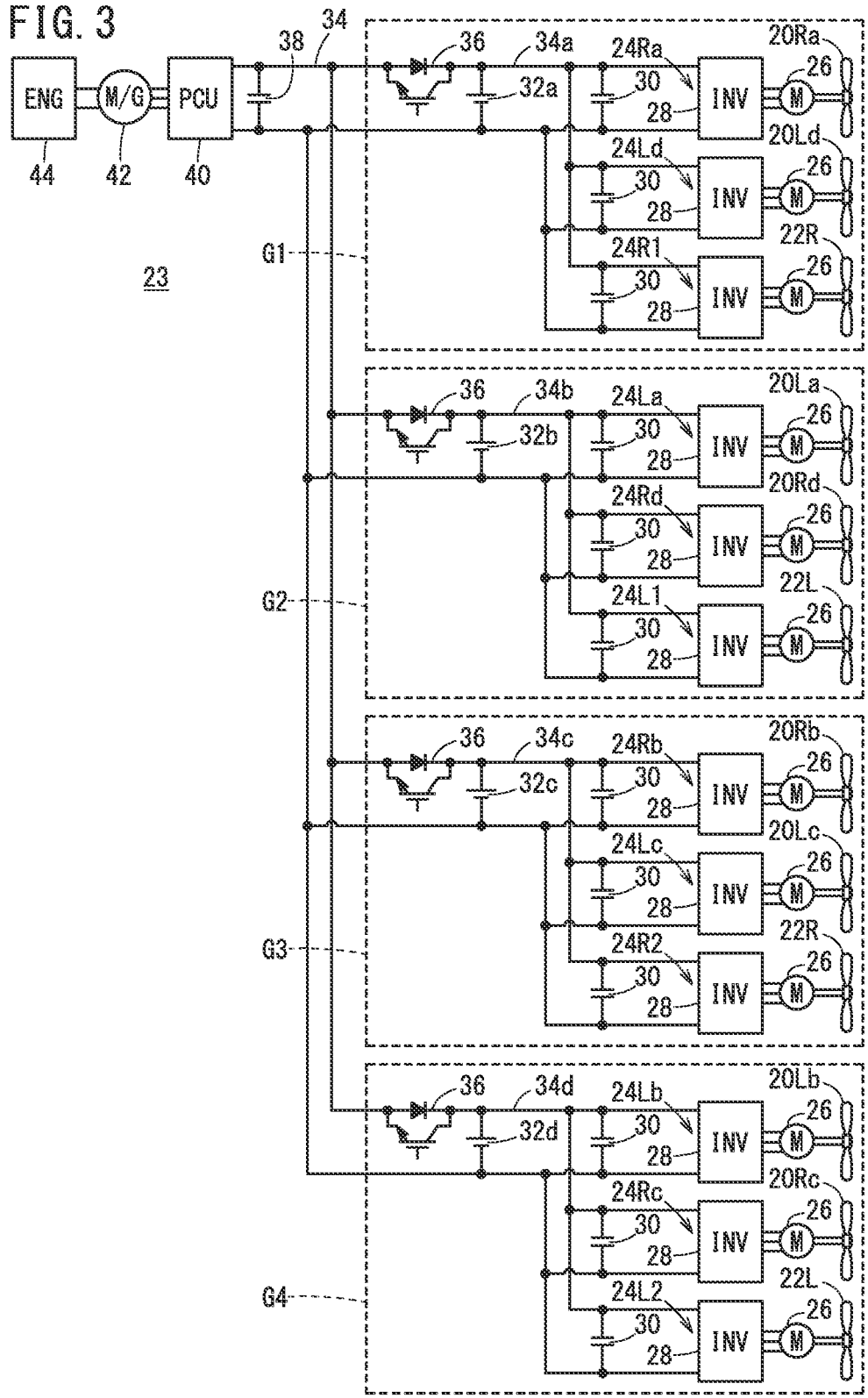
FIG. 3 is a circuit diagram of the power supply system.

The configuration of an aircraft 10 will be described with reference to FIG. 1. In the present embodiment, an electric vertical take-off and landing aircraft (eVTOL aircraft) is assumed as the aircraft 10. The electric vertical take-off and landing aircraft generates lift and thrust by a plurality of rotors. The drive source for each rotor is an electric motor 26 (FIG. 2). Further, in the present embodiment, a hybrid aircraft is assumed as the aircraft 10. The hybrid aircraft can operate the electric motor 26 with power supplied from a battery 32 (FIG. 2). Further, the hybrid aircraft can operate the electric motor 26 with power supplied from a motor generator 42 (FIG. 3). The hybrid aircraft can also charge the battery 32.

The aircraft 10 includes a fuselage 12, a front wing 14, a rear wing 16, two booms 18, eight VTOL rotors 20, and two cruise rotors 22.

The front wing 14 is connected to a front portion of the fuselage 12. The front wing 14 generates lift when the aircraft 10 moves forward. The rear wing 16 is connected to a rear portion of the fuselage 12. The rear wing 16 generates lift when the aircraft 10 moves forward.

The two booms 18 include a right boom 18R and a left boom 18L. The right boom 18R is disposed on the right side of the fuselage 12. The left boom 18L is disposed on the left side of the fuselage 12. The two booms 18 are connected to the front wing 14 and the rear wing 16. The two booms 18 are connected to the fuselage 12 via the front wing 14 and the rear wing 16. The boom 18R and the boom 18L respectively support four VTOL rotors 20.

Each VTOL rotor 20 is used during vertical takeoff, during transition from vertical takeoff to cruise, during transition from cruise to vertical landing, during vertical landing, and during hovering of the aircraft 10. The rotation axis of each VTOL rotor 20 is arranged in parallel with the vertical direction. Each VTOL rotor 20 rotates about the rotation axis to generate lift.

The eight VTOL rotors 20 include four VTOL rotors 20Ra to 20Rd disposed on the right side of the fuselage 12, and four VTOL rotors 20La to 20Ld disposed on the left side of the fuselage 12. The VTOL rotors 20Ra to 20Rd on the right side are supported by the boom 18R. The VTOL rotors 20Ra to 20Rd on the right side are arranged in the order of the VTOL rotor 20Ra, the VTOL rotor 20Rb, the VTOL rotor 20Rc, and the VTOL rotor 20Rd from the front to the rear. The VTOL rotors 20La to 20Ld on the left side are supported by the boom 18L. The VTOL rotors 20La to 20Ld on the left side are arranged in the order of the VTOL rotor 20La, the VTOL rotor 20Lb, the VTOL rotor 20Lc, and the VTOL rotor 20Ld from the front to the rear. The VTOL rotors 20Ra to 20Rd on the right side and the VTOL rotors 20La to 20Ld on the left side are disposed bilaterally symmetrically about a vertical plane including a central axis A of the fuselage 12. The VTOL rotors 20Ra to 20Rd on the right side and the VTOL rotors 20La to 20Ld on the left side may be disposed so as to be point-symmetric about the center of gravity G of the aircraft.

Each cruise rotor 22 is used during cruise, during transition from vertical takeoff to cruise, and during transition from cruise to vertical landing of the aircraft 10. The rotation axis of each cruise rotor 22 is arranged in parallel with the front-rear direction. Each cruise rotor 22 rotates about the rotation axis to generate thrust.

The two cruise rotors 22 include a cruise rotor 22R disposed on the right side of the fuselage 12, and a cruise rotor 22L disposed on the left side of the fuselage 12. The two cruise rotors 22 are supported by the fuselage 12. The two cruise rotors 22 are arranged bilaterally symmetrically about the vertical plane including the central axis A of the fuselage 12.

Figure 9:
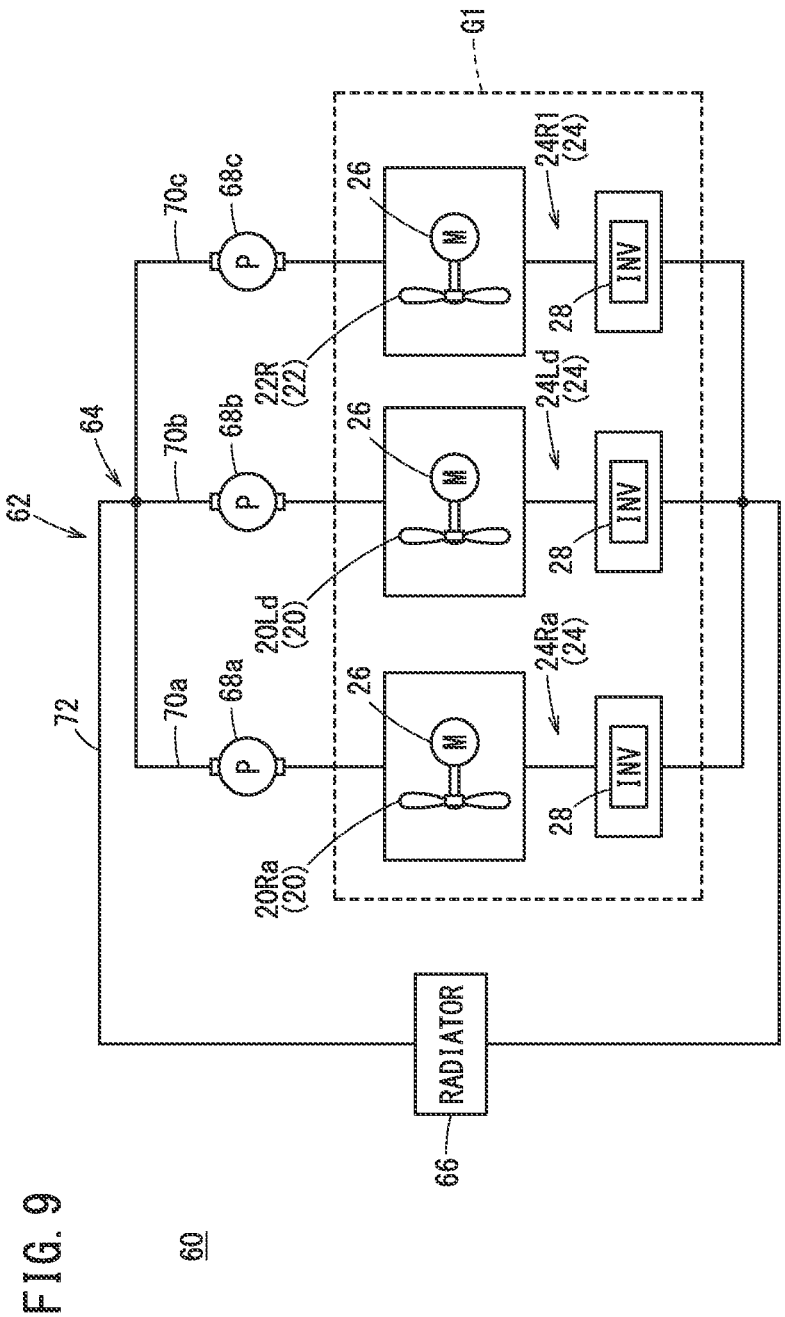
FIG. 9 is a circuit diagram of a cooling system.

The aircraft 10 includes a drive mechanism (not shown) and a power supply system 23 (FIGS. 2 and 3). The drive mechanism and the power supply system 23 rotate each VTOL rotor 20 and each cruise rotor 22. The aircraft 10 also includes a cooling system 60 (FIG. 9). The cooling system 60 cools each electrical component included in the power supply system 23.

2. Configuration of Power Supply System 23

The configuration of the power supply system 23 will be described with reference to FIGS. 2 and 3. As shown in FIG. 2, one component group 24 is provided for each VTOL rotor 20. Two component groups 24 are provided for each cruise rotor 22. The power supply system 23 shown in FIGS. 2 and 3 includes twelve component groups 24. Further, the power supply system 23 includes four groups (a first group G1 to a fourth group G4). Each group includes three component groups 24 and one battery 32. Each component group 24 includes a plurality of electrical components such as, in this instance, the electric motor 26, an inverter 28 (INV), and a first smoothing capacitor 30. The electric motor 26 is connected to the battery 32 via the inverter 28 and the first smoothing capacitor 30.

The electric motor 26 is a three phase motor. An output shaft of the electric motor 26 is coupled to a rotating shaft of a corresponding rotor (the VTOL rotor 20 or the cruise rotor 22). The inverter 28 includes a plurality of switching elements such as IGBTs. A primary side terminal of the inverter 28 is connected to the first smoothing capacitor 30 and the battery 32. A secondary side terminal of the inverter 28 is connected to the electric motor 26. The inverter 28 converts DC power input to the primary side terminal into three phase AC power and outputs the three phase AC power from the secondary side terminal. With the above configuration, each electric motor 26 is operated with the power supplied from the battery 32.

As shown in FIG. 3, the primary side terminal of the inverter 28, the first smoothing capacitor 30, and each battery 32 (32a, 32b, 32c, 32d) are connected to the motor generator 42 via a switch 36, a second smoothing capacitor 38, and a power control unit (PCU) 40.

The motor generator 42 functions not only as a three phase motor but also as a three phase generator. A rotating shaft of the motor generator 42 is coupled to an output shaft of an engine (ENG) 44. The PCU 40 includes an inverter circuit. A primary side terminal of the PCU 40 is connected to the motor generator 42. A secondary side terminal of the PCU 40 is connected to the second smoothing capacitor 38. Further, the secondary side terminal of the PCU 40 is connected to the battery 32 and the primary side terminal of the inverter 28 via the switch 36. The PCU 40 converts three phase AC power input to the primary side terminal into DC power by the inverter circuit. The PCU 40 outputs the DC power after conversion from the secondary side terminal. Further, the PCU 40 converts DC power input to the secondary side terminal into three phase AC power by the inverter circuit. The PCU 40 outputs the three phase AC power from the primary side terminal. The switch 36 includes a switching element such as an IGBT and a diode. The switch 36 allows supply of power from the PCU 40 side to the battery 32 side at all times, and allows supply of power from the battery 32 side to the PCU 40 side when turned on. With the above configuration, the motor generator 42 can output the generated power to the battery 32 and the inverter 28. Further, when the switch 36 is turned on, the motor generator 42 is operated with power supplied from the battery 32. When power is supplied to the motor generator 42, the engine 44 is started. As the engine 44, a known internal combustion engine such as a reciprocating engine or a gas turbine engine can be used. Note that the PCU 40 may include a DC-DC converter circuit.

FIGS. 2 and 3 show the power supply system 23 in a simplified manner. The power supply system 23 also includes other electrical components. Examples of the electrical component (not shown) include an electric load other than the electric motor 26, a resistor, a coil, a capacitor, various sensors, a fuse, a relay, and a breaker.

Figure 4:
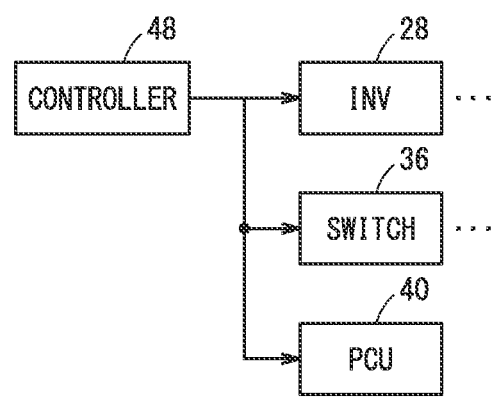
FIG. 4 is a diagram showing control blocks of the power supply system.

As shown in FIG. 4, the aircraft 10 is provided with a controller 48. The controller 48 includes, for example, a processor such as a CPU, or an integrated circuit such as an ASIC or an FPGA. For example, the processor realizes various functions by executing programs stored in the memory. The controller 48 outputs control signals to the switching elements of the inverters 28, the switching elements of the switches 36, and the switching elements of the PCU 40 to control the operations of the switching elements.

3. Operation of Power Supply System 23

The operation of the power supply system 23 will be described with reference to FIGS. 2 and 3. When the aircraft 10 is started, the controller 48 turns on at least one switch 36 in accordance with the operation of an occupant. Further, the controller 48 controls the operation of each switching element of the PCU 40 in accordance with the operation of the occupant. Then, power is supplied from at least one battery 32 (32a, 32b, 32c, 32d) to the motor generator 42 via the PCU 40. The PCU 40 converts DC power supplied from the battery 32 into AC power and outputs the AC power to the motor generator 42. The motor generator 42 is operated by being supplied with power to thereby start the engine 44.

After the engine 44 is started, the motor generator 42 generates power by the operation of the engine 44. In this state, power can be supplied from the motor generator 42 to the battery 32 and the component group 24 of each group via the PCU 40. The PCU 40 converts AC power generated by the motor generator 42 into DC power and outputs the DC power to each battery 32 and each component group 24. The inverter 28 converts DC power output from the PCU 40 or DC power supplied from the battery 32 into AC power and outputs the AC power to the electric motor 26. The electric motor 26 is operated by being supplied with power to thereby rotate the rotor (the VTOL rotor 20 or the cruise rotor 22).

When the electric motor 26 is rotated by the power of the battery 32, the switching element of each switch 36 is basically turned off. Therefore, power is not supplied from the battery 32 of one group to the component group 24 of another group. However, it is also possible to turn on the switching elements of the switches 36 to supply power from the battery 32 of one group to the component group 24 of another group.

4. Example of Grouping Component Group 24 and Battery 32

As shown in FIGS. 2 and 3, in the power supply system 23, the plurality of component groups 24 and the plurality of batteries 32 are grouped into four groups (first group G1 to fourth group G4) each including three component groups 24 and one battery 32. The plurality of component groups 24 in the same group are supplied with power from one battery 32 in the same group. Here, one battery 32 is constituted by one battery module or a plurality of battery modules. The battery 32 of each group is independent of the batteries 32 of other groups.

The first group G1 includes a component group 24Ra corresponding to the VTOL rotor 20Ra, a component group 24Ld corresponding to the VTOL rotor 20Ld, a component group 24R1 corresponding to the cruise rotor 22R, and the battery 32a. The electrical components of the first group G1 are connected by wires 34a.

The second group G2 includes a component group 24La corresponding to the VTOL rotor 20La, a component group 24Rd corresponding to the VTOL rotor 20Rd, a component group 24L1 corresponding to the cruise rotor 22L, and the battery 32b. The electrical components of the second group G2 are connected by wires 34b.

The third group G3 includes a component group 24Rb corresponding to the VTOL rotor 20Rb, a component group 24Lc corresponding to the VTOL rotor 20Lc, a component group 24R2 corresponding to the cruise rotor 22R, and the battery 32c. The electrical components of the third group G3 are connected by wires 34c.

The fourth group G4 includes a component group 24Lb corresponding to the VTOL rotor 20Lb, a component group 24Rc corresponding to the VTOL rotor 20Rc, a component group 24L2 corresponding to the cruise rotor 22L, and the battery 32d. The electrical components of the fourth group G4 are connected by wires 34d.

For redundancy, the electric motor 26 of the component group 24R1 and the electric motor 26 of the component group 24R2 are connected to the same cruise rotor 22R. Typically, both of the component groups 24R1 and 24R2 are used to rotate the cruise rotor 22R. If one of the component groups 24 fails, the other component group 24 is used to rotate the cruise rotor 22R. Similarly, the electric motor 26 of the component group 24L1 and the electric motor 26 of the component group 24L2 are connected to the same cruise rotor 22L.

4.1. Reason for Grouping (1)

From the viewpoint of reducing the number of batteries 32, it is conceivable that one battery 32 is shared by all the component groups 24. However, in this case, other problems such as the need for the battery 32 having a large capacity arise. Therefore, it is preferable to provide the plurality of batteries 32. Furthermore, it is preferable to efficiently combine the component groups 24 and the batteries 32. In the present embodiment, the plurality of component groups 24 and the plurality of batteries 32 are divided into four groups (first group G1 to fourth group G4) for the following reason.

Figure 1:
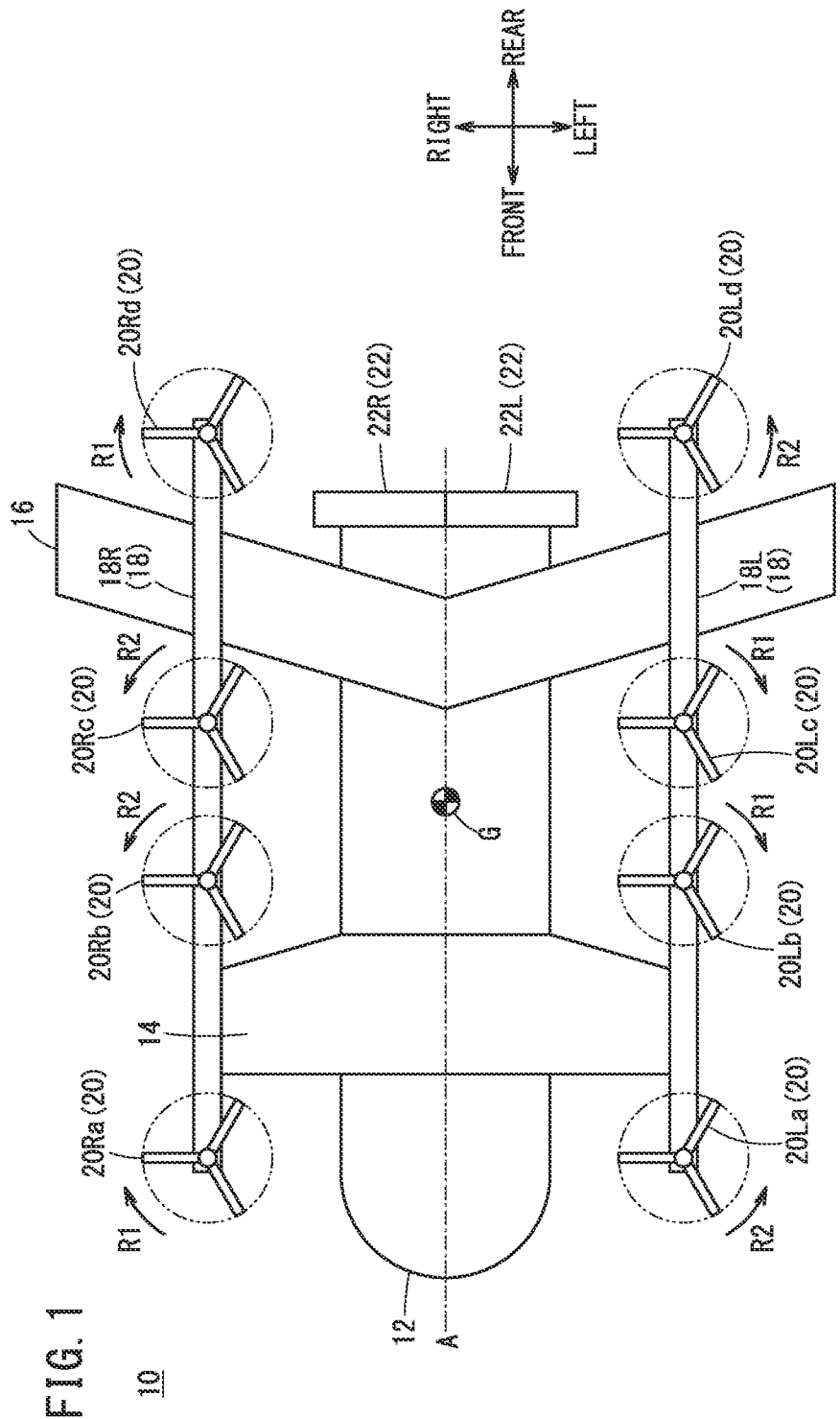
FIG. 1 is a schematic view of an aircraft seen from above.

As shown in FIG. 1, in the present embodiment, the two VTOL rotors 20 disposed at positions symmetrical to each other about the center of gravity G rotate in opposite directions. For example, the rotation direction of the right-side VTOL rotor 20Ra is R1. This rotation direction is opposite to a rotation direction (R2) of the left-side VTOL rotor 20Ld positioned symmetrically to (paired with) the VTOL rotor 20Ra. Further, the rotation direction of the left-side VTOL rotor 20La is R2. This rotation direction is opposite to the rotation direction (R1) of the right-side VTOL rotor 20Rd paired with the VTOL rotor 20La. The rotation direction of the right-side VTOL rotor 20Rb is R2. This rotation direction is opposite to the rotation direction (R1) of the left-side VTOL rotor 20Lc paired with the VTOL rotor 20Rb. Further, the rotation direction of the left-side VTOL rotor 20Lb is R1. This rotation direction is opposite to the rotation direction (R2) of the right-side VTOL rotor 20Rc paired with the VTOL rotor 20Lb.

As the VTOL rotor 20 rotates, thrust and reaction force (torque reaction force) are generated by the rotor blades. As described above, by rotating the two paired VTOL rotors 20 in opposite directions, it is possible to cancel out the reaction forces generated on the aircraft.

For example, if the electrical system or mechanical system associated with one VTOL rotor 20 fails, this VTOL rotor 20 stops. In this case, if the other VTOL rotor 20 paired with the stopped VTOL rotor 20 is kept rotating, the reaction force generated by the other VTOL rotor 20 acts on the aircraft without being cancelled. Then, a yaw moment is generated on the aircraft. In addition, if the other VTOL rotor 20 paired with the stopped VTOL rotor 20 is kept rotating, the balance of thrust between the left and right VTOL rotors 20 is lost. Then, a roll moment and a pitching moment are generated on the aircraft. In order to avoid such a situation, when one of the paired VTOL rotors 20 is stopped due to a failure or the like, it is necessary to stop the other VTOL rotor 20. As a result, it is possible to suppress the yaw moment caused by the imbalance of the reaction forces (torque reaction forces). In addition, it is possible to suppress the roll moment and the pitching moment caused by the imbalance of the thrust.

For this reason, when the battery 32 is shared by the plurality of component groups 24, it is efficient to share the battery 32 by two component groups 24 corresponding to two paired VTOL rotors 20. Therefore, in the present embodiment, two component groups 24 corresponding to two paired VTOL rotors 20 and one battery 32 are grouped into the same group.

Note that the combination of the two VTOL rotors 20 whose reaction forces cancel out each other may be a combination different from the above example. For example, two VTOL rotors 20 adjacent to each other in the left-right direction may form a pair like the VTOL rotor 20Ra and the VTOL rotor 20La. Further, like the VTOL rotor 20Ra and the VTOL rotor 20Rc, two VTOL rotors 20 arranged in the front-rear direction with one VTOL rotor 20 interposed therebetween may form a pair. Alternatively, two VTOL rotors 20 whose rotation directions are opposite to each other may form a pair. Based on the above-described concept, for rotors other than the VTOL rotors 20 shown in FIG. 1, it is possible to set a combination of paired rotors by setting the rotation direction of each rotor.

4.2. Reason for Grouping (2)

Figure 5:
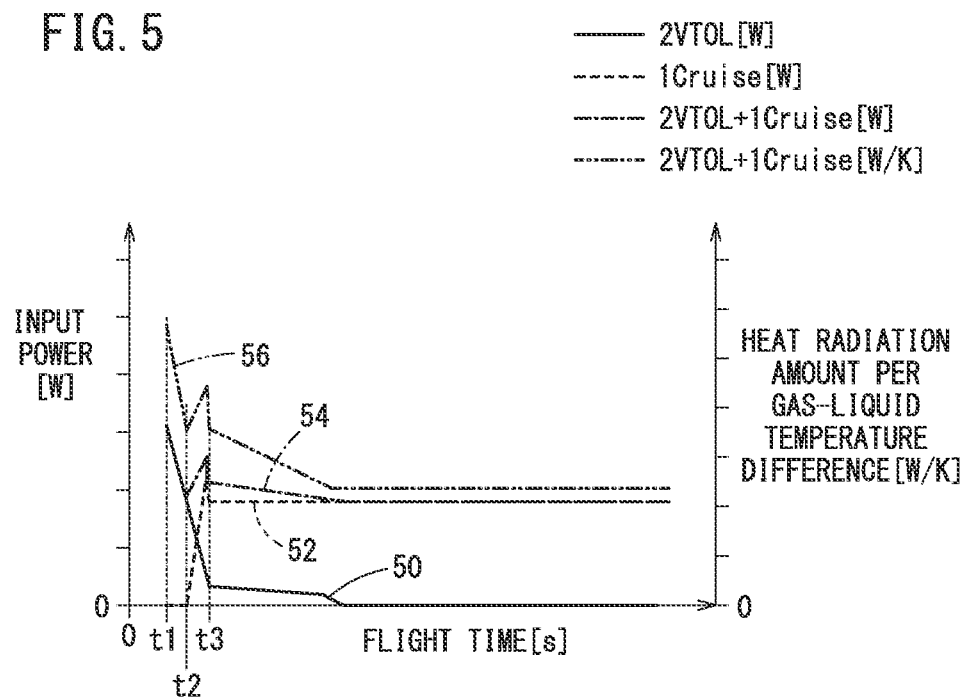
FIG. 5 is a diagram showing the flight time after takeoff, the input power of an inverter, and the heat radiation amount per gas-liquid temperature difference.

The horizontal axis shown in FIG. 5 represents a flight time [s] of the aircraft 10. The vertical axis shown in FIG. 5 represents power [W] input from the battery 32 or the motor generator 42 to the inverter 28, and a heat radiation amount per gas-liquid temperature difference [W/K]. The heat radiation amount per gas-liquid temperature difference is defined as heat radiation amount/(coolant temperature–outside air temperature). The heat radiation amount per gas-liquid temperature difference has a correlation with a heat generation amount [W] of the inverter 28 (and the electric motor 26). The transition of the heat radiation amount per gas-liquid temperature difference and the heat generation amount [W] of the inverter 28 (and the electric motor 26) can have the same characteristics as a fourth transition 56 described later.

In FIG. 5, three changes of power over time are shown as a first transition 50, a second transition 52, and a third transition 54. In FIG. 5, a change of thermal resistance over time is shown as the fourth transition 56. The first transition 50 indicates a transition of input power of the two inverters 28 corresponding to the two VTOL rotors 20. The two VTOL rotors 20 are two paired VTOL rotors 20 (see [4.1.] above). The second transition 52 indicates a transition of input power of one inverter 28 corresponding to one cruise rotor 22. The third transition 54 indicates a transition of the sum of the input power of the first transition 50 and the input power of the second transition 52. The fourth transition 56 indicates a transition of a value obtained by converting the power of the third transition 54 into a heat radiation amount (heat generation amount) per gas-liquid temperature difference.

The flight state from time t1 to time t2 is vertical takeoff. In this time period, basically, the VTOL rotors 20 are used and the cruise rotors 22 are not used. Therefore, as indicated by the first transition 50, the input power of the inverters 28 corresponding to the VTOL rotors 20 is large. On the other hand, as indicated by the second transition 52, the input power of the inverter 28 corresponding to the cruise rotor 22 is small.

The flight state from the time t2 to time t3 is a transition from vertical takeoff to cruise. In this time period, basically, the usage rate of the VTOL rotors 20 is gradually decreased, and the usage rate of the cruise rotors 22 is gradually increased. Therefore, as indicated by the first transition 50, the input power of the inverters 28 corresponding to the VTOL rotors 20 gradually decreases. On the other hand, as indicated by the second transition 52, the input power of the inverter 28 corresponding to the cruise rotor 22 gradually increases.

The flight state after the time point t3 is cruise. In this time period, basically, the cruise rotors 22 are used, and the VTOL rotors 20 are not used or are used to some extent. Therefore, as indicated by the second transition 52, the input power of the inverter 28 corresponding to the cruise rotor 22 is large. On the other hand, as indicated by the first transition 50, the input power of the inverters 28 corresponding to the VTOL rotors 20 is small.

The performance of the cooling system 60 is proportional to the difference between the temperature of the coolant and the outside air temperature. Since the outside air temperature decreases as the altitude of the aircraft 10 increases, the cooling capacity of the cooling system 60 increases. That is, the cooling capacity of the cooling system 60 can be higher at the time t2 and thereafter than at the time t1.

Figure 6:
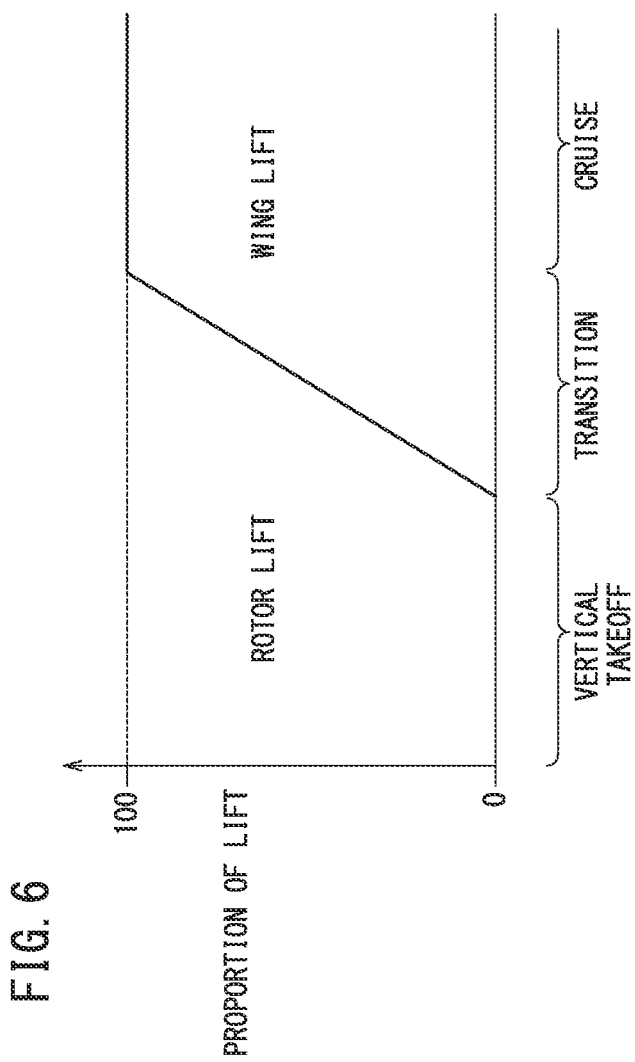
FIG. 6 is a diagram showing a change of an element that generates lift accompanying a change in a flight state.

As shown in FIG. 6, the lift required during vertical takeoff is obtained by the rotation of the VTOL rotors 20 (rotor lift). On the other hand, the lift required during transition from vertical takeoff to cruise is obtained by the rotation of the VTOL rotors 20 and by the wings (the front wing 14 and the rear wing 16). The lift (wing lift) obtained by the wings increases as the moving speed of the aircraft increases. The lift required during cruise is obtained by the wings. During vertical takeoff (and vertical landing) in which lift is generated by the rotation of the VTOL rotors 20, the input power of the inverters 28 corresponding to the VTOL rotors 20 is large. On the other hand, the input power of the inverters 28 corresponding to the VTOL rotors 20 is relatively small during cruise in which lift is generated by the wings.

During a period from takeoff to cruise of the aircraft 10 (from the time t1 to the time t3) and during cruise (after the time t3), the maximum value of the third transition 54 is not significantly different from the maximum value of the first transition 50 and the maximum value of the second transition 52. That is, one battery 32 can be shared by two component groups 24 corresponding to two VTOL rotors 20 and one component group 24 corresponding to one cruise rotor 22. For this reason, in the present embodiment, two component groups 24 corresponding to two paired VTOL rotors 20, one component group 24 corresponding to one cruise rotor 22, and one battery 32 are grouped into the same group.

4.3. How to Combine Component Group 24 of Cruise Rotor 22

Each group is constituted by a combination of two component groups 24 corresponding to two paired VTOL rotors 20 and a component group 24 corresponding to one cruise rotor 22. The cruise rotor 22 is provided on each of the left and right sides. In each group, which of the component groups 24R1 and 24R2 corresponding to the cruise rotor 22R and the component groups 24L1 and 24L2 corresponding to the cruise rotor 22L is combined is determined based on the following concept.

The difference between the distance from one VTOL rotor 20 of the two paired VTOL rotors 20 to the right-side cruise rotor 22R and the distance from the other VTOL rotor 20 to the right-side cruise rotor 22R is defined as D1. Further, the difference between the distance from the one VTOL rotor 20 to the left-side cruise rotor 22L and the distance from the other VTOL rotor 20 to the left-side cruise rotor 22L is defined as D2. In each group, a combination with the smaller difference is adopted.

For example, the first group G1 will be described as an example. The difference between the distance from the VTOL rotor 20Ra to the right-side cruise rotor 22R and the distance from the VTOL rotor 20Ld to the right-side cruise rotor 22R is defined as D1. Further, the difference between the distance from the VTOL rotor 20Ra to the left-side cruise rotor 22L and the distance from the VTOL rotor 20Ld to the left-side cruise rotor 22L is defined as D2. In this case, D1 is smaller than D2. Therefore, the first group G1 has a combination of the component group 24Ra, the component group 24Ld, and the component group 24R1. The same applies to other groups. Thus, in the same group, the difference of the distances from two component groups 24 corresponding to the VTOL rotors 20 to one component group 24 corresponding to the cruise rotor 22 is reduced.

4.4. Position of Battery 32

The battery 32 is disposed so that the length of a wire 34 is minimized. For example, the first group G1 will be described as an example. The length of the wire 34a from the electric motor 26 for rotating one VTOL rotor 20Ra to the battery 32a is defined as L1. Further, the length of the wire 34a from the electric motor 26 for rotating the other VTOL rotor 20Ld to the battery 32a is defined as L2. Furthermore, the length of the wire 34a from the electric motor 26 for rotating the cruise rotor 22R to the battery 32a is defined as L3. In this case, the battery 32a is arranged so that the sum of the lengths L1+L2+L3 is minimized.

5. Another Example of Grouping Component Group 24 and Battery 32

Figure 7:
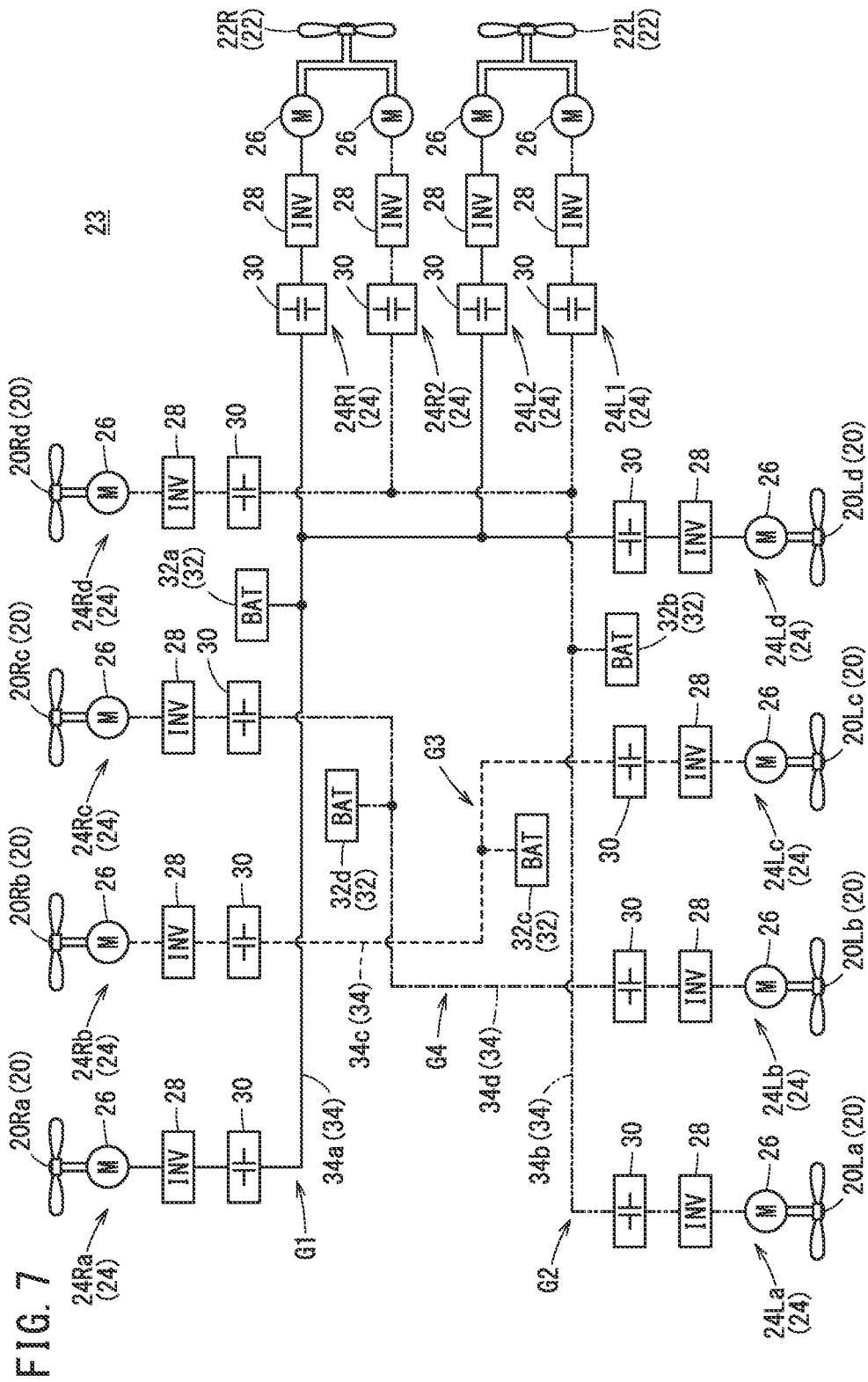
FIG. 7 is a diagram showing an arrangement of each rotor and each component group in the power supply system.
Figure 8:
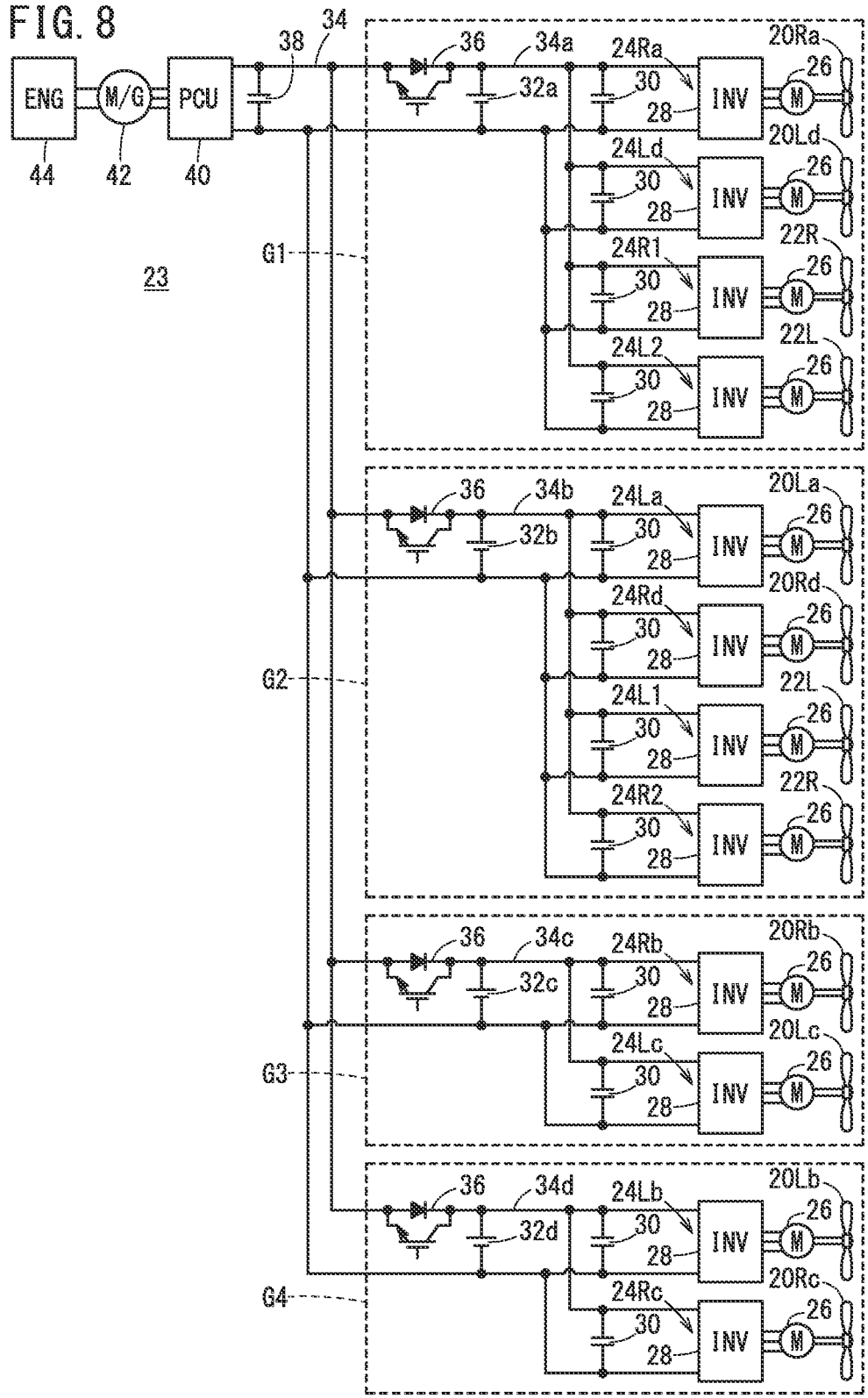
FIG. 8 is a circuit diagram of the power supply system.

Grouping other than the example shown in FIGS. 2 and 3 is also possible. For example, grouping as shown in FIGS. 7 and 8 may be performed. In this example, the plurality of component groups 24 and the plurality of batteries 32 are grouped into first group G1 to fourth group G4. The first group G1 and the second group G2 each include four component groups 24 and one battery 32. The third group G3 and the fourth group G4 each include two component groups 24 and one battery 32.

Grouping other than the example shown in FIGS. 7 and 8 is also possible. For example, one component group 24 corresponding to the VTOL rotor 20, one component group 24 corresponding to one cruise rotor 22, and one battery 32 may be grouped into the same group.

6. Configuration of Cooling System 60

The configuration of the cooling system 60 will be described with reference to FIG. 9. In the present embodiment, one independent cooling system 60 is provided for one group of the power supply system 23. The power supply system 23 shown in FIGS. 2 and 3 is provided with four independent cooling systems 60. FIG. 9 shows the cooling system 60 of the first group G1 shown in FIGS. 2 and 3.

The cooling system 60 is a liquid-cooled cooling system having a higher cooling capacity than an air-cooled cooling system. The cooling system 60 includes a cooling circuit 62. The cooling circuit 62 includes one radiator 66 and three pumps (first pump 68a to third pump 68c) in piping 64 through which a coolant flows. The cooling circuit 62 is a closed circuit. The coolant is a liquid.

The piping 64 includes three parallel pipes 70a, 70b, and 70c connected in parallel to each other, and a common pipe 72. The common pipe 72 allows communication between the upstream side and the downstream side of each of the parallel pipes 70a, 70b, and 70c. The radiator 66 is provided on the common pipe 72.

The parallel pipe 70a is arranged to cool the component group 24Ra (for example, the electric motor 26 and the inverter 28) corresponding to the VTOL rotor 20Ra. The parallel pipe 70a may be arranged to cool other electrical components of the component group 24Ra. On the parallel pipe 70a, the first pump 68a is provided on the upstream side of the component group 24Ra.

The parallel pipe 70b is arranged to cool the component group 24Ld (for example, the electric motor 26 and the inverter 28) corresponding to the VTOL rotor 20Ld. The parallel pipe 70b may be arranged to cool other electrical components of the component group 24Ld. On the parallel pipe 70b, the second pump 68b is provided on the upstream side of the component group 24Ld.

The parallel pipe 70c is arranged to cool the component group 24R1 (for example, the electric motor 26 and the inverter 28) corresponding to the cruise rotor 22R. The parallel pipe 70c may be arranged to cool other electrical components of the component group 24R1. On the parallel pipe 70c, the third pump 68c is provided on the upstream side of the component group 24R1.

In the cooling circuit 62 shown in FIG. 9, the pumps (first pump 68a to third pump 68c) are provided on the parallel pipes 70a, 70b, and 70c, respectively. Alternatively, a common pump may be provided on the common pipe 72.

As shown in FIG. 5, during a period from takeoff to cruise of the aircraft 10 (from the time t1 to the time t3) and during cruise (after the time t3), the maximum value of the third transition 54 is not significantly different from the maximum value of the first transition 50 and the maximum value of the second transition 52. This means that the maximum value of the fourth transition 56 is not significantly different from the maximum value of the heat generation amount of two component groups 24 corresponding to two VTOL rotors 20 and the maximum value of the heat generation amount of one component group 24 corresponding to one cruise rotor 22. That is, one cooling circuit 62 can be shared by two component groups 24 corresponding to two VTOL rotors 20 and one component group 24 corresponding to one cruise rotor 22. Therefore, in the present embodiment, two component groups 24 corresponding to two paired VTOL rotors 20 and one component group 24 corresponding to one cruise rotor 22 are collectively cooled by the same cooling circuit 62. Further, the battery 32a may be cooled by the cooling circuit 62.

7. Operation of Cooling System 60

The operation of the cooling system 60 will be described with reference to FIG. 9. When the first pump 68a operates, the coolant circulates through the parallel pipe 70a and the common pipe 72. When the second pump 68b operates, the coolant circulates through the parallel pipe 70b and the common pipe 72. When the third pump 68c operates, the coolant circulates through the parallel pipe 70c and the common pipe 72. The coolant absorbs heat from each electrical component of each component group 24 and releases heat at the radiator 66. In this way, each electrical component is cooled.

As described in [4.3.] above, in the same group, there is little difference of the distances from two component groups 24 corresponding to the VTOL rotors 20 to one component group 24 corresponding to the cruise rotor 22. Therefore, there is little difference in the lengths of the parallel pipes 70a, 70b, and 70c in the same group. Therefore, by arranging the radiator 66 at an appropriate position, it is possible to reduce a difference in pressure loss of the coolant flowing through the parallel pipes 70a, 70b, and 70c, and to reduce a difference in discharge head among the first pump 68a to the third pump 68c.

8. Other Embodiments

In the above embodiment, the power supply system 23 and the cooling system 60 have been described by taking the aircraft 10 including the eight VTOL rotors 20 and the two cruise rotors 22 as an example. However, the power supply system 23 and the cooling system 60 may be provided in other aircraft 10 including different numbers of rotors. For example, the power supply system 23 and the cooling system 60 may be provided in an aircraft 10 including two or more VTOL rotors 20. In this case as well, two component groups 24 corresponding to two paired VTOL rotors 20 and one battery 32 may be included in the same group. In addition, when the aircraft 10 includes the cruise rotor 22, one or more component groups 24 corresponding to one or more VTOL rotors 20, the component group 24 corresponding to the cruise rotor 22, and one battery 32 may be included in the same group.

The power supply system 23 may have a circuit other than the circuits shown in FIGS. 3 and 8. In short, as long as the respective component groups 24 are combined in the above-described combination, any circuit can be adopted for the power supply system 23.

Note that the present invention is applicable not only to a hybrid aircraft having the engine 44 and the motor generator 42 but also to an electric aircraft that does not have the engine 44 and the motor generator 42. As an example, in the circuits shown in FIGS. 3 and 8, the components from the second smoothing capacitor 38 to the engine 44 may be omitted. In this case, by switching each switch 36 as necessary, power can be supplied from the battery 32 of one group to the other group. As another example, in the circuits shown in FIGS. 3 and 8, the components from the second smoothing capacitor 38 to the engine 44 and the switch 36 of each group may be omitted. In this case, the groups are insulated from each other.

The power supply system 23 and the cooling system 60 of the above-described embodiment may be provided for an aircraft 10 including a tiltrotor.

9. Technical Idea Obtained from Embodiments

Technical ideas that can be grasped from the above embodiments will be described below.

According to an aspect of the present invention, provided is a cooling system 60 comprising: a rotor (VTOL rotor 20, cruise rotor 22) configured to generate at least one of lift or thrust of an aircraft 10; a component group 24 formed of a plurality of electrical components each configured to rotate the rotor; and a cooling circuit 62 configured to cool the plurality of electrical components, wherein the rotor is provided in plurality and the component group 24 is provided in plurality, the plurality of component groups 24 corresponding to the plurality of rotors, and the plurality of component groups 24 are cooled by the same cooling circuit 62.

According to the above-described configuration, since the plurality of component groups 24 are cooled by the same cooling circuit 62, it is not necessary to individually provide the cooling circuit 62 for each component group 24. That is, according to the above-described configuration, the components (the piping 64, the radiator 66, and the like) of the cooling circuit 62 are shared by the plurality of component groups 24. Therefore, according to the above-described configuration, the number of components of the cooling system 60 provided in the aircraft 10 can be reduced. As a result, the cooling system 60 provided in the aircraft 10 is simplified and lightened.

In the aspect of the present invention, the rotors may include a VTOL rotor 20 configured to generate the lift when the aircraft 10 moves in a vertical direction, and a cruise rotor 22 configured to generate the thrust when the aircraft 10 moves in a horizontal direction, the component groups 24 may include a VTOL component group (for example, the component group 24Ra) corresponding to the VTOL rotor 20, and a cruise component group (for example, the component group 24R1) corresponding to the cruise rotor 22, and the VTOL component group and the cruise component group may be cooled by the same cooling circuit 62.

The VTOL rotor 20 is mainly used during vertical takeoff and vertical landing. On the other hand, the cruise rotor 22 is mainly used during cruise. Therefore, the maximum value of the sum of the first input power of the component group 24 corresponding to the VTOL rotor 20 and the second input power of the component group 24 corresponding to the cruise rotor 22 is not significantly different from the maximum value of the first input power and the maximum value of the second input power. Therefore, even if the battery 32 is shared by the component group 24 corresponding to the VTOL rotor 20 and the component group 24 corresponding to the cruise rotor 22, the battery 32 does not need to have a large capacity. Therefore, from the viewpoint of simplifying the circuit and reducing the size of the battery 32, the combination of the component group 24 corresponding to the VTOL rotor 20, the component group 24 corresponding to the cruise rotor 22, and the battery 32 is appropriate.

The input power of the component group 24 corresponds to the heat generation amount of the component group 24. Therefore, even if the cooling circuit 62 is shared by the component group 24 corresponding to the VTOL rotor 20 and the component group 24 corresponding to the cruise rotor 22, the cooling circuit 62 does not need to have a large cooling capacity. Therefore, from the viewpoint of simplification and miniaturization of the cooling circuit 62, the combination of the component group 24 corresponding to the VTOL rotor 20, the component group 24 corresponding to the cruise rotor 22, and the battery 32 is appropriate.

In the aspect of the present invention, the rotors may include two VTOL rotors 20 configured to generate the lift when the aircraft 10 moves in the vertical direction and cancel out reaction forces thereof, the component groups 24 may include two VTOL component groups (for example, the component groups 24Ra and 24Ld) corresponding to the two VTOL rotors 20, and the two VTOL component groups may be cooled by the same cooling circuit 62.

When one of the two VTOL rotors 20 that cancel out the reaction forces stops due to a failure or the like, it is necessary to also stop the other VTOL rotor 20. In other words, the two VTOL rotors 20 that cancel out the reaction forces always operate together. Therefore, from the viewpoint of efficiently cooling the electrical components, the combination of the battery 32 and the two component groups 24 corresponding to the two VTOL rotors 20 that cancel out the reaction forces is appropriate.

In the aspect of the present invention, the rotors may include two first VTOL rotors (for example, the VTOL rotor 20Ra and the VTOL rotor 20Ld) configured to generate the lift when the aircraft 10 moves in the vertical direction and cancel out reaction forces thereof, two second VTOL rotors (for example, the VTOL rotor 20La and the VTOL rotor 20Rd) configured to generate the lift when the aircraft 10 moves in the vertical direction and cancel out reaction forces thereof, and a first cruise rotor (for example, the cruise rotor 22R) and a second cruise rotor (for example, the cruise rotor 22L) each configured to generate the thrust when the aircraft 10 moves in the horizontal direction, the component groups may include two first VTOL component groups (for example, the component groups 24Ra and 24Ld) corresponding to the two first VTOL rotors, two second VTOL component groups (for example, the component groups 24La and 24Rd) corresponding to the two second VTOL rotors, a first cruise component group (for example, the component group 24R1) corresponding to the first cruise rotor, and a second cruise component group (for example, the component group 24L1) corresponding to the second cruise rotor, the cooling system may comprise, as the cooling circuit 62, a first cooling circuit and a second cooling circuit, and the two first VTOL component groups and the first cruise component group may be cooled by the first cooling circuit, and the two second VTOL component groups and the second cruise component group may be cooled by the second cooling circuit.

As described above, from the viewpoint of simplification and miniaturization of the cooling circuit 62, the combination of the component group 24 corresponding to the VTOL rotor 20, the component group 24 corresponding to the cruise rotor 22, and the battery 32 is appropriate. In addition, from the viewpoint of efficiently cooling the electrical components, the combination of the battery 32 and the two component groups 24 corresponding to the two VTOL rotors 20 that cancel out the reaction forces is appropriate.

In the aspect of the present invention, a difference (D1) between a distance from one of the first VTOL rotors (for example, the VTOL rotor 20Ra) to the first cruise rotor (for example, the cruise rotor 22R) and a distance from another of the first VTOL rotors (for example, the VTOL rotor 20Ld) to the first cruise rotor (for example, the cruise rotor 22R) may be smaller than a difference (D2) between a distance from the one of the first VTOL rotors (for example, the VTOL rotor 20Ra) to the second cruise rotor (for example, the cruise rotor 22L) and a distance from the other of the first VTOL rotors (for example, the VTOL rotor 20Ld) to the second cruise rotor (for example, the cruise rotor 22L).

According to the above-described configuration, in the same group, there is little difference of the distances from two component groups 24 corresponding to the vertical takeoff and landing rotors 20 to one component group 24 corresponding to the cruise rotor 22. Therefore, there is little difference in the lengths of the parallel pipes 70a, 70b, and 70c in the same group. Therefore, by appropriately arranging the radiator 66, it is possible to reduce the difference in head among the first pump 68a to the third pump 68c.

In the aspect of the present invention, each of the component groups 24 may include a drive circuit (inverter 28) for an electric motor 26.

In the aspect of the present invention, at least one of the component groups 24 may include a battery 32 configured to supply power to the electric motor 26 via the drive circuit.

In the aspect of the present invention, the cooling circuit 62 may include piping 64, a radiator 66, and a plurality of pumps (first pump 68a to third pump 68c), the piping 64 may include a plurality of parallel pipes 70a, 70b, and 70c that are connected in parallel to each other, and a common pipe 72 configured to allow communication between an upstream side and a downstream side of each of the parallel pipes 70a, 70b, and 70c, the parallel pipes 70a, 70b, and 70c may be provided as many as a number of the component groups 24, and may be arranged so as to cool the component groups 24, respectively, each of the pumps may be provided on each of the parallel pipes 70a, 70b, and 70c, the radiator 66 may be provided on the common pipe 72, and a discharge head of each of the pumps may be determined according to a length of a circulating path constituted by each of the parallel pipes 70a, 70b, and 70c and the common pipe 72.

In the aspect of the present invention, the aircraft 10 may include a wing (front wing 14, rear wing 16) configured to generate the lift when the aircraft 10 moves forward.

The present invention is not particularly limited to the embodiment described above, and various modifications are possible without departing from the essence and gist of the present invention.

What is claimed is:

1. An aircraft comprising:
    a first rotor configured to generate at least one of lift or thrust;
    a second rotor configured to generate at least one of lift or thrust;
    a first component group formed of a plurality of electrical components each configured to rotate the first rotor;
    a second component group formed of a plurality of electrical components each configured to rotate the second rotor; and
    a cooling circuit configured to cool the first component group and the second component group,
    wherein
    the cooling circuit includes
        piping,
        a radiator,
        a first pump, and
        a second pump, and
    the piping includes
        a first pipe provided with the first pump and arranged so as to cool the first component group,
        a second pipe provided with the second pump and arranged so as to cool the second component group, and
        a common pipe provided with the radiator and connected to an upstream-side end and a downstream-side end of each of the first pipe and the second pipe.

2. The aircraft according to claim 1, further comprising a fuselage,
    wherein
    the first rotor includes a rotation axis fixed along a direction perpendicular to a central axis of the fuselage and is configured to generate thrust only in an axial direction of the rotation axis, and
    the second rotor includes a rotation axis fixed along a direction parallel to the central axis of the fuselage and is configured to generate thrust only in an axial direction of the rotation axis.

3. The aircraft according to claim 1, further comprising a fuselage,
    wherein the first rotor and the second rotor each include a rotation axis fixed along a direction perpendicular to a central axis of the fuselage, and wherein the first rotor and the second rotor are configured to generate thrust only in an axial direction of the rotation axis.

4. The aircraft according to claim 1, wherein each of the first component group and the second component group includes a drive circuit for an electric motor.

5. The aircraft according to claim 4, wherein at least one of the first component group or the second component group includes a battery configured to supply power to the electric motor via the drive circuit.

6. The aircraft according to claim 1, further comprising a wing configured to generate lift when the aircraft moves forward.

\* \* \* \* \*